(12) United States Patent
Natori et al.

(10) Patent No.: US 10,313,095 B2
(45) Date of Patent: Jun. 4, 2019

(54) CONTROL SYSTEM

(71) Applicant: Hitachi, Ltd., Chiyoda-ku, Tokyo (JP)

(72) Inventors: Katsunobu Natori, Tokyo (JP);
Tetsuya Nakajima, Tokyo (JP); Satoshi Nishikawa, Tokyo (JP); Masahiro Shiraishi, Tokyo (JP); Hideo Harada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/728,592

(22) Filed: Oct. 10, 2017

(65) Prior Publication Data

US 2018/0115405 A1    Apr. 26, 2018

(30) Foreign Application Priority Data

Oct. 26, 2016   (JP) ................ 2016-209160

(51) Int. Cl.
*H04L 1/18*     (2006.01)
*H04L 5/14*     (2006.01)
(Continued)

(52) U.S. Cl.
CPC ........... *H04L 5/14* (2013.01); *G06F 7/57* (2013.01); *G06F 11/0796* (2013.01); *G06F 11/1633* (2013.01); *H04L 1/0061* (2013.01)

(58) Field of Classification Search
None
See application file for complete search history.

(56) References Cited

U.S. PATENT DOCUMENTS

| | | | | |
|---|---|---|---|---|
| 3,859,513 A | * | 1/1975 | Chuang ............... | G06F 11/181 326/14 |
| 5,931,791 A | * | 8/1999 | Saltzstein ............ | A61B 5/0205 128/904 |

(Continued)

FOREIGN PATENT DOCUMENTS

| | | |
|---|---|---|
| EP | 0 273 081 A1 | 7/1988 |
| EP | 1 857 936 A1 | 11/2007 |

(Continued)

OTHER PUBLICATIONS

European Search Report issued in counterpart European Application No. 17197343.1 dated Mar. 14, 2018 (seven (7) pages).

*Primary Examiner* — Mujtaba M Chaudry
(74) *Attorney, Agent, or Firm* — Crowell & Moring LLP (57) ABSTRACT

A control system includes an arithmetic device configured of an A system arithmetic unit including a data dividing unit, a B system arithmetic unit including a data dividing unit, and an A system communication control unit including a data combining unit and a collation unit, wherein the A system arithmetic unit and the B system arithmetic unit have a duplex configuration, the A system arithmetic unit and the B system arithmetic unit are separated by a gap, a frame output from the A system arithmetic unit is transmitted to a B system communication control unit through the A system communication control unit and an interface element, and a frame output from the B system arithmetic unit is transmitted to the A system communication control unit through the B system communication control unit and an interface element.

5 Claims, 8 Drawing Sheets

(51) Int. Cl.
*G06F 7/57* (2006.01)
*H04L 1/00* (2006.01)
*G06F 11/07* (2006.01)
*G06F 11/16* (2006.01)

(56) References Cited

U.S. PATENT DOCUMENTS

| | | | | |
|---|---|---|---|---|
| 8,359,529 B2 * | 1/2013 | Maniwa | ............. | G05B 19/0428 |
| | | | | 714/819 |
| 2007/0222608 A1 * | 9/2007 | Maniwa | ............... | G06K 7/0008 |
| | | | | 340/572.7 |
| 2013/0166232 A1 * | 6/2013 | Lee | ........................ | G01R 21/00 |
| | | | | 702/62 |
| 2014/0330440 A1 * | 11/2014 | Park | ........................ | F22B 35/00 |
| | | | | 700/286 |
| 2016/0241247 A1 | 8/2016 | Kanno et al. | | |

FOREIGN PATENT DOCUMENTS

| | | |
|---|---|---|
| JP | 58-119233 A | 7/1983 |
| JP | 2015-115727 A | 6/2015 |
| WO | WO 2015/045135 A1 | 4/2015 |
| WO | WO 2015/068207 A1 | 5/2015 |
| WO | WO 2015/104810 A1 | 7/2015 |

* cited by examiner

CONTROL SYSTEM

BACKGROUND OF THE INVENTION

1. Field of the Invention

The present invention relates to a control system, and in particular, to a control system of a duplex configuration including an integrated circuit of collating data between different power supply systems.

2. Description of the Related Art

It is necessary for a system used in a site where the ensuring of safety is taken on the highest priority, such as a chemical plant or a nuclear power plant, to have high reliability. A method of duplexing an arithmetic device or input and output devices inside is used as means for improving reliability. In a device where high reliability is required, it is general that the output of each duplexed system is collated, and thus, the abnormality of the device is detected. In addition, majority decision processing using not only duplexing but also tripling, and a technology of repairing a faulty system by copying a non-faulty device to a faulty device have also recently been established.

For example, in JP-2015-115727-A, a programmable logic device is described in which in a case where there is discordance in the collation of the duplex, a cyclic CRAM (a configuration RAM) frame check for detecting software is paused, and error detection is performed for each circuit configuration information item, and thus, it is possible for CRAM check to be ended within an allowable range of a system even in a duplexed logical configuration, and a normal arithmetic result to be obtained.

In addition, in WO2015-104810, a field programmable gate array (FPGA) is described in which a logical configuration is set to a first configuration having low programmability and a second configuration having high programmability, and a logical circuit, which is an originally intended purpose, is duplexed and is mounted on the second logical configuration, a comparator of determining a collation result of an input signal is mounted on the first logical configuration, and the output of the duplexed logical circuit is compared by the comparator, and thus, a problem that the number of test patterns of a look-up table (LUT) of a comparator in the FPGA increases is solved, and a high-reliability system using the FPGA is described.

In addition, in WO2015-068207, a programmable device is described in which a flip flop (FF) configured to be copiable is subjected to copying by a number of cycles set independently from a logical circuit in each tripled logic, and thus, repair system tripling in which the consumption of a resource of a logical cell and wiring of a FPGA is suppressed is realized without causing a copying failure even in a case of a configuration where the FF is connected in multiple stages.

In addition, in WO2015-045135, a programmable logic device is described in which reliability against failure in a CRAM which is disposed to be divided into a plurality of areas is higher than other areas, an arithmetic result of an arithmetic unit is processed in a high reliable area, and arithmetic processing is performed in the other areas, and a logical integrated tool is described.

In addition, in JP-58-119233-A, a logical array device is described in which a programmable logic array (PLA) is duplexed, and thus, the presence or absence of a defect is examined in each unit, and a correct arithmetic result is output from one of the duplexed PLA, for example, by automatically degenerating a defective state to a logical safe side, and thus, a test of the PLA is easily performed, and improvement of a yield ratio of the PLA is targeted.

SUMMARY OF THE INVENTION

There are many methods of further increasing the reliability by using duplexing and tripling as described in the patent literatures shown above, but there is a problem of mounting convergence of a device according to a multiple system. In particular, in a substrate configuration in which a gap is provided such that wirings between the systems do not cross, in a case where signal transmission between different power supply systems is required, it is necessary to dispose an interface element between the systems, and thus, the mounting convergence is degraded.

Therefore, an object of the present invention is to provide a control system in which in collation of duplexing, the number of interface elements used is reduced even in a case where signal transmission between different power supply systems is required, and thus, mounting convergence of a device is improved.

In order to solve the problem, a control system according to the present invention (a duplex system in the present invention is defined to be an A system and a B system) includes: an arithmetic device configured of an A system arithmetic unit including a data dividing unit, a B system arithmetic unit including a data dividing unit, and an A system communication control unit including a data combining unit and a collation unit, wherein the A system arithmetic unit and the B system arithmetic unit have a duplex configuration, the A system arithmetic unit and the B system arithmetic unit are separated by a gap, a frame output from the A system arithmetic unit is transmitted to a B system communication control unit through the A system communication control unit and an interface element, and a frame output from the B system arithmetic unit is transmitted to the A system communication control unit through the B system communication control unit and an interface element.

According to the present invention, in collation of duplexing, the number of interface elements used can be reduced even in a case where signal transmission between different power supply systems is required, and thus, mounting convergence of a device can be improved.

DESCRIPTION OF THE PREFERRED EMBODIMENTS

Hereinafter, an embodiment of the present invention will be described in detail with reference to the drawings.

Figure 1:
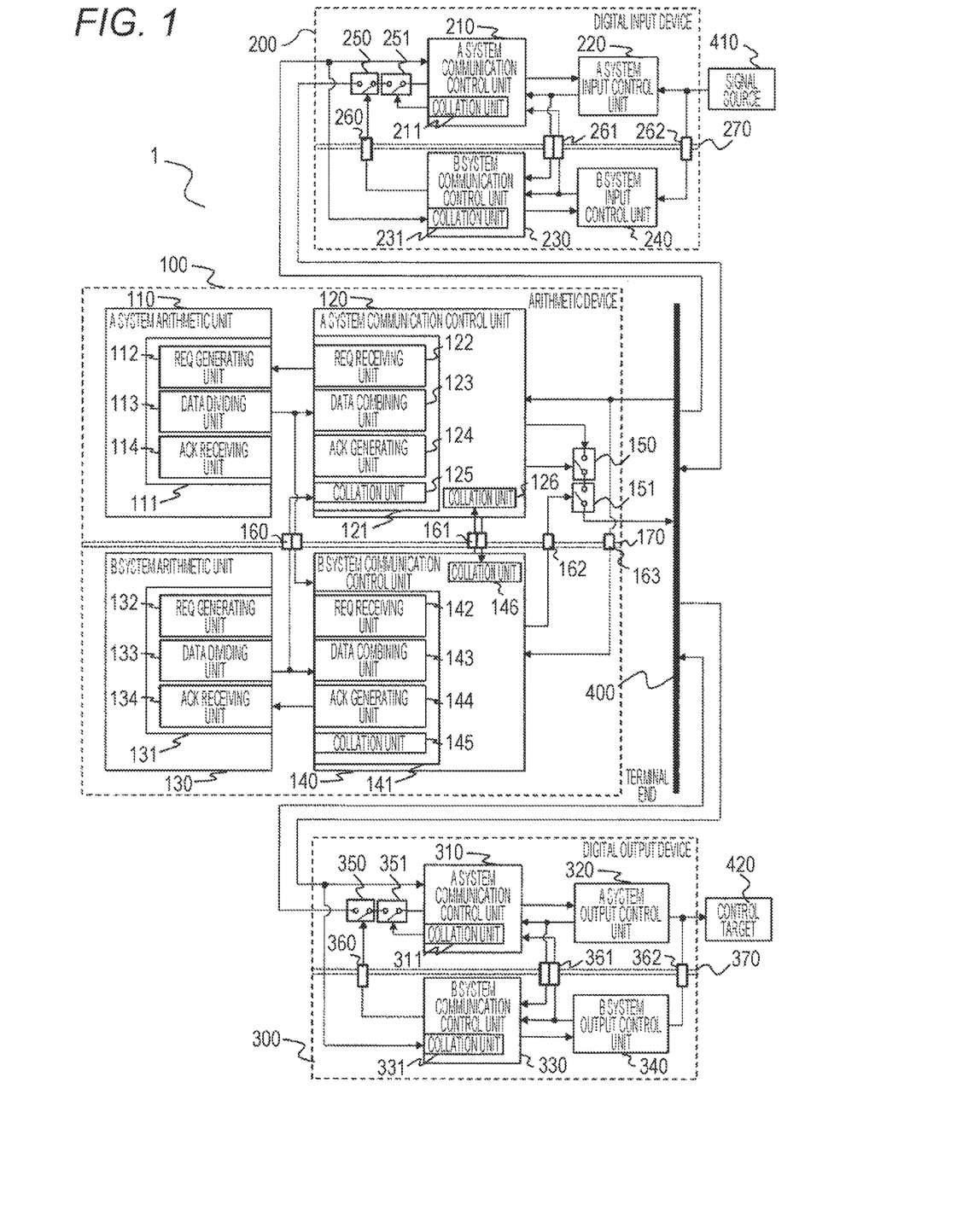
FIG. 1 is a diagram illustrating a configuration of a control system according to an embodiment of the present invention.

FIG. 1 is a diagram illustrating a configuration of a control system according to an embodiment of the present invention. The application assumption of this embodiment is mainly a site where the ensuring of safety is taken on the highest priority, such as a chemical plant or a nuclear power plant, and this embodiment can be applied to all devices which have a duplex configuration. A control system 1 is a digital control device in which an internal function is duplexed by an A system and a B system in order to improve reliability. Furthermore, duplexing the internal function is an example, and multipling more than tripling can be also applied.

As illustrated in FIG. 1, the control system 1 includes an arithmetic device 100, a digital input device 200, and a digital output device 300. The arithmetic device 100 and the digital input device 200, and the arithmetic device 100 and the digital output device 300 are respectively connected by a communication line 400. On the other hand, communication between devices in the arithmetic device 100, the digital input device 200, and the digital output device 300 is performed by a frame. In addition, there are a digital type and an analog type in an input device and an output device, respectively, and a plurality of input devices can be connected in addition to the digital input device 200 and the digital output device 300 illustrated in FIG. 1. Furthermore, a signal source 410 of a digital signal to be input from a plant is connected to the digital input device 200, and a control target 420 is connected to the digital output device 300.

The control of the control system 1 is performed by setting the arithmetic device 100 as a master. In order to acquire a digital signal required for control arithmetic from the digital input device 200, the arithmetic device 100 performs an import request of a digital signal with respect to the digital input device 200 through a communication line 400. In a case where the import request is received, the digital input device 200 accesses the signal source 410, performs the import of the digital signal, and outputs the acquired signal as a response to the arithmetic device 100 through the communication line 400. In a case where the response from the digital input device 200 is received, the arithmetic device 100 performs the control arithmetic on the basis of the received data, and outputs a signal according to an arithmetic result to the digital output device 300 through the communication line 400. In a case where the signal according to the arithmetic result is received from the arithmetic device 100, the digital output device 300 performs output with respect to the control target 420. In a case where the entire output is completed, the digital output device 300 outputs again the response to the arithmetic device 100 through the communication line 400 in order to notify the arithmetic device 100 of the gist.

Arithmetic Device

The arithmetic device 100 includes an A system arithmetic unit 110, an A system communication control unit 120, a B system arithmetic unit 130, a B system communication control unit 140, a blocking section 150 according to a collation result of the A system communication control unit, a blocking section 151 according to a collation result of the B system communication control unit, an interface element 160 which is required at the time of transmitting a control arithmetic result to another system, an interface element 161 which is required at the time of transmitting a frame output from the communication control unit to another system, an interface element 162 which is required at the time of transmitting the collation result of the B system communication control unit 140 to an A system, and an interface element 163 which is required at the time of transmitting in input signal from the communication line 400 to the B system communication control unit. Furthermore, a physical area where the A system arithmetic unit 110, the A system communication control unit 120, the blocking section 150, and the blocking section 151 are operated, and a physical area where the B system arithmetic unit 130 and the B system communication control unit 140 are operated are separated by a gap 170.

The A system arithmetic unit 110 includes a master interface control unit 111 configured of an REQ generating unit 112 generating an access request with respect to the digital input device 200 and the digital output device 300, a data dividing unit 113 dividing the transmitted frame, and an ACK receiving unit 114 receiving a response signal from the digital input device 200 and the digital output device 300.

As with the A system arithmetic unit 110, the B system arithmetic unit 130 includes a master interface control unit 131 configured of an REQ generating unit 132 generating an access request with respect to the digital input device 200 and the digital output device 300, a data dividing unit 133 dividing the transmitted frame, and an ACK receiving unit 134 receiving a response signal from the digital input device 200 and the digital output device 300. The A system arithmetic unit 110 and the B system arithmetic unit 130 have a duplex configuration, and the A system arithmetic unit 110 and the B system arithmetic unit 130 have functions equivalent to each other.

The A system communication control unit 120 includes a target interface control unit 121 configured of an REQ receiving unit 122 receiving the access request with respect to the digital input device 200 and the digital output device 300, which is output from the A system arithmetic unit 110, a data combining unit 123 combining the divided data, which is output from the A system arithmetic unit 110, an ACK generating unit 124 generating a response signal with respect to the access request, which is output from the A system arithmetic unit 110, and a collation unit 125 collating arithmetic results of the A system arithmetic unit 110 and the B system arithmetic unit 130. As with the A system communication control unit 120, the B system communication control unit 140 includes a target interface control unit 141 configured of an REQ receiving unit 142 receiving the access request with respect to the digital input device 200 and the digital output device 300, which is output from the B system arithmetic unit 130, a data combining unit 143 combining the divided data, which is output from the B system arithmetic unit 130, an ACK generating unit 144 generating a response signal with respect to the access request, which is output from the B system arithmetic unit 130, and a collation unit 125 collating arithmetic results of the B system arithmetic unit 130 and the A system arithmetic unit 110. The collation of the frames output from the A system communication control unit 120 and the B system communication control unit 140 is performed by a collation unit 126 in the A system communication control unit 120, and is performed by a collation unit 146 in the B system communication control unit 140. The A system communication control unit 120 and the B system communication control unit 140 have a duplex configuration, and the A system communication control unit 120 and the B system communication control unit 140 have functions equivalent to each other.

The frames output from the A system arithmetic unit 110 and the B system arithmetic unit 130 are collated by a collation unit 125 in the A system communication control unit and a collation unit 145 in the B system communication control unit. In a case where a collation result of the collation unit 125 is discordant, frame transmission is blocked by the blocking section 150, and the frame is not transmitted to the communication line 400. In addition, in a case where a collation result of the collation unit 145 is discordant, frame transmission is blocked by the blocking section 151, and the frame is not transmitted to the communication line 400. According to such collation and blocking of the frame transmission, the reliability of the device increases.

Digital Input Device

The digital input device 200 includes an A system communication control unit 210 controlling communication between devices, an A system input control unit 220 importing the digital signal from the signal source 410, a B system communication control unit 230 controlling the communication between the devices as with the A system communication control unit 210, a B system input control unit 240 addressing the digital signal from the signal source 410, a blocking section 251 according to a collation result of the collation unit 211 in the A system communication control unit 210, a blocking section 250 according to a collation result of the collation unit 231 in the B system communication control unit 230, an interface element 262 which is required at the time of transmitting the digital signal from the signal source 410, an interface element 261 which is required when the A system input control unit 220 and the B system input control unit 240 respectively transmit the signal to another system, and an interface element 260 which is required at the time of transmitting a collation result of the B system communication control unit 230 to the A system. Furthermore, in the digital input device 200, as with the arithmetic device 100, a physical area where the A system communication control unit 210, the A system input control unit 220, the blocking section 250, and the blocking section 251 are operated and a physical area where the B system communication control unit 230 and the B system input control unit 240 are operated are separated by a gap 270.

The A system communication control unit 210 and the B system communication control unit 230 have a duplex configuration, and have equivalent functions. Similarly, the A system input control unit 220 and the B system input control unit 240 have a duplex configuration, and have equivalent functions.

The digital signals input into the A system input control unit 220 and the B system input control unit 240 are input in parallel from the signal source 410. The collation unit 211 in the A system communication control unit 210 collates the digital signals output from the A system input control unit 220 and the B system input control unit 240. In a case where the collation result is discordant, the signal transmission is blocked by the blocking section 251, and the signal is not transmitted to the communication line 400. Similarly, the collation unit 231 in the B system communication control unit 230 collates the digital signals output from the A system input control unit 220 and the B system input control unit 240. In a case where the collation result is discordant, the signal transmission is blocked by the blocking section 250, and the signal is not transmitted to the communication line 400. According to such collation and blocking of the signal transmission, the reliability of the device increases.

Digital Output Device

The digital output device 300 includes an A system communication control unit 310 controlling the communication between the devices, an A system output control unit 320 outputting the digital signal to the control target 420, a B system communication control unit 330 controlling the communication between the devices as with the A system communication control unit 310, a B system output control unit 340 outputting the digital signal to the control target 420, a blocking section 351 according to a collation result of a collation unit 311 positioned in the A system communication control unit 310, a blocking section 350 according to a collation result of a collation unit 331 positioned in the B system communication control unit 330, an interface element 362 which is required at the time of transmitting the digital signal to the control target 420, an interface element 361 which is required when the A system output control unit 320 and the B system output control unit 340 respectively transmit the signal to another system, and an interface element 360 which is required at the time of transmitting a collation result of the B system communication control unit 330 to the A system. Furthermore, in the digital output device 300, as with the arithmetic device 100, a physical area where the A system communication control unit 310, the A system output control unit 320, the blocking section 350, and the blocking section 351 are operated and a physical area where the B system communication control unit 330 and the B system output control unit 340 are operated are separated by a gap 370.

The A system communication control unit 310 and the B system communication control unit 330 have a duplex configuration, and have equivalent functions. Similarly, the A system output control unit 320 and the B system output control unit 340 have a duplex configuration, and have equivalent functions.

The collation unit 311 positioned in the A system communication control unit 310 collates the response signals output from the A system output control unit 320 and the B system output control unit 340. In a case where the collation result is discordant, the signal transmission is blocked by the blocking section 351, and the signal is not transmitted to the communication line 400. Similarly, the collation unit 331 positioned in the B system communication control unit 330 collates the response signals output from the A system output control unit 320 and the B system output control unit 340. In a case where the collation result is discordant, the signal transmission is blocked by the blocking section 350, and the signal is not transmitted to the communication line 400. According to such collation and blocking of the signal transmission, the reliability of the device increases.

Hereinafter, the operation of the control system 1 configured as described above will be described in detail.

Figure 2:
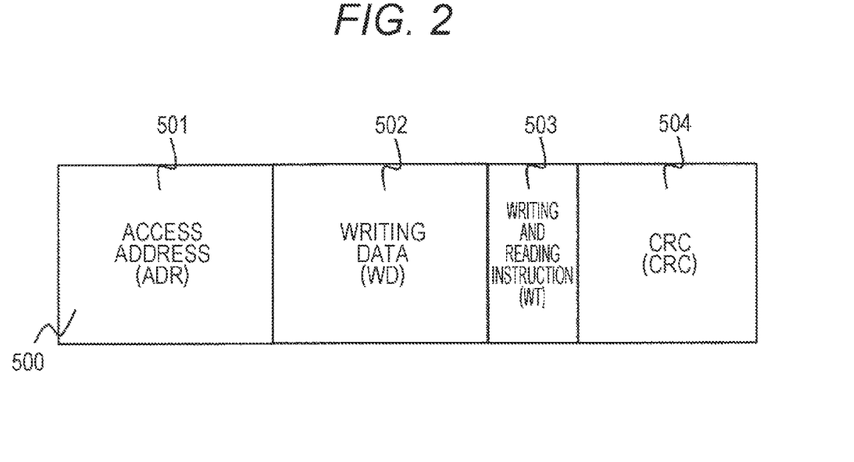
FIG. 2 is a diagram illustrating an example of a frame which is output from an arithmetic unit of an arithmetic device.

First, the operation of the arithmetic device 100 of the control system 1 will be described. As illustrated in FIG. 1, the arithmetic device 100 is configured of the A system arithmetic unit 110, the A system communication control unit 120, the B system arithmetic unit 130, and the B system communication control unit 140, and the A system arithmetic unit 110 and the B system arithmetic unit 130, and the A system communication control unit 120 and the B system communication control unit 140 have a duplex configuration, respectively. The A system arithmetic unit 110 instructs the A system communication control unit 120 and the B system communication control unit 140 to perform an input request with respect to the digital input device 200, and the B system arithmetic unit 130 instructs the A system communication control unit 120 and the B system communication control unit 140 to perform an input request. As illustrated in FIG. 2, for example, such instruction of the input request is performed by a frame 500 formed of an access address (ADR) 501 in the communication control unit, writing data (WD) 502 into the communication control unit, writing and reading instruction (WT) 503, and a CRC 504 for guaranteeing the soundness of the frame with respect to the communication control unit.

In order to confirm that there is no abnormality in the instruction of the input request described above, the instruction of the input request, which is output from the A system arithmetic unit 110, and the instruction of the input request, which is output from the B system arithmetic unit 130, are collated by the collation unit 125 in the A system communication control unit 120 and the collation unit 145 in the B system communication control unit 140, and thus, it is confirmed that the A system arithmetic unit 110 and the B system arithmetic unit 130 are normally operated. In a case where the collation result of the collation unit 125 is discordant, the transmission of the input request instruction of the A system arithmetic unit 110 to the communication line 400 is blocked by the blocking section 150, and in a case where the collation result of the collation unit 145 is discordant, the transmission of the input request instruction of the A system arithmetic unit 110 to the communication line 400 is blocked by the blocking section 151, and thus, an abnormal communication frame is further prevented from being transmitted to other devices, and the reliability is improved.

Figure 3:
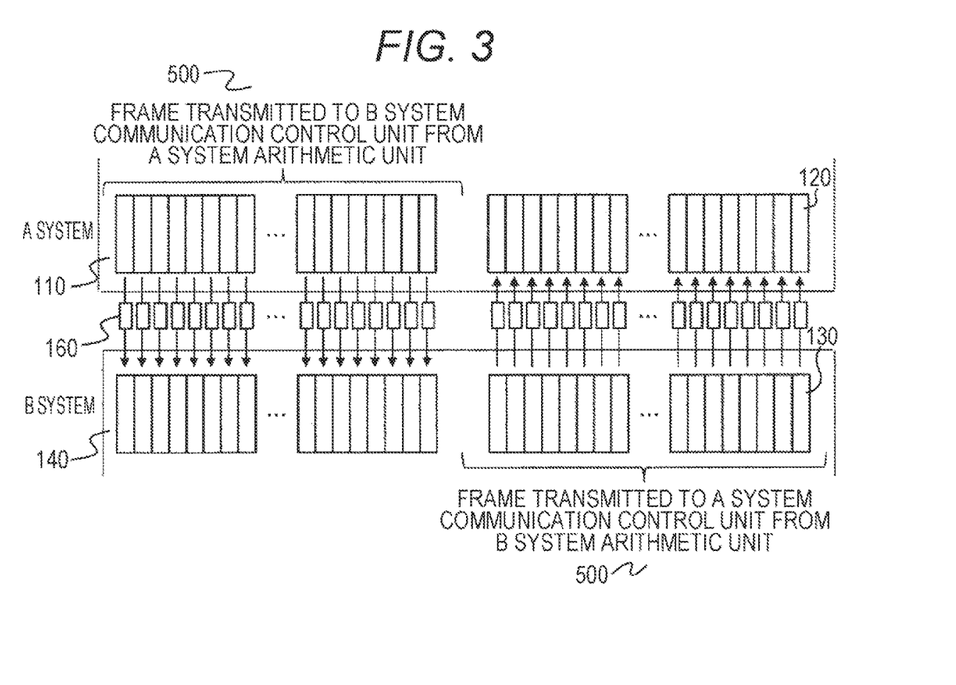
FIG. 3 is a diagram illustrating an interface element which is disposed at the time of transmitting a signal between different power supply systems.

In order to perform the collation of the collation unit 125 and the collation unit 145, the signal transmission across the gap 170 is required, and the interface element 160 is required to be disposed for the signal transmission between different power supply systems. As illustrated in FIG. 3, it is necessary that the frame 500 which is transmitted to the B system communication control unit 140 from the A system arithmetic unit 110 is routed through the interface element 160, and similarly, it is necessary that the frame 500 which is transmitted to the A system communication control unit 120 from the B system arithmetic unit 130 is routed through the interface element 160, and thus, in a case where a signal width of the frame output from the A system arithmetic unit 110 and the B system arithmetic unit 130 increases, the number of the interface elements 160 used also increases.

Figure 4:
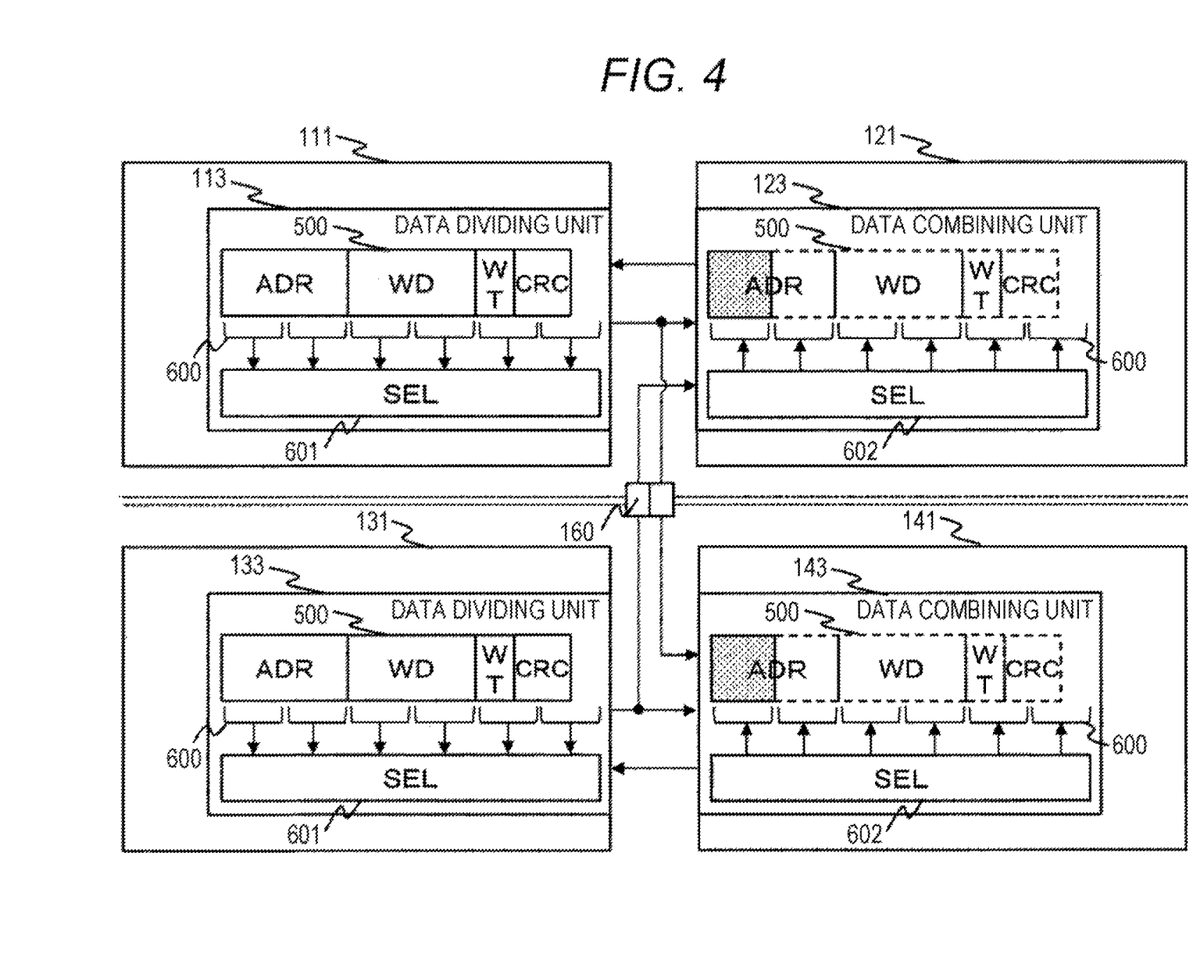
FIG. 4 is a diagram illustrating a dividing method of the frame which is output from the arithmetic unit.

In order to reduce the interface element 160, the signal width to be transmitted may be decreased by dividing the frame 500. For example, as illustrated in FIG. 4, the frame output from the A system arithmetic unit 110 and the B system arithmetic unit 130 is divided according to a data width 600, and the divided frame to be output is selected by a data selector 601 provided in the data dividing unit 113 in the A system arithmetic unit 110 and the data dividing unit 133 in the B system arithmetic unit 130, and is output to the same system communication control unit and the other system communication control unit, and the divided frame input into the communication control unit is reconstructed to the frame 500 by a data selector 602 provided in the A system communication control unit 120 and the B system communication control unit 140, and thus, it is possible to decrease the signal width.

Figure 5:
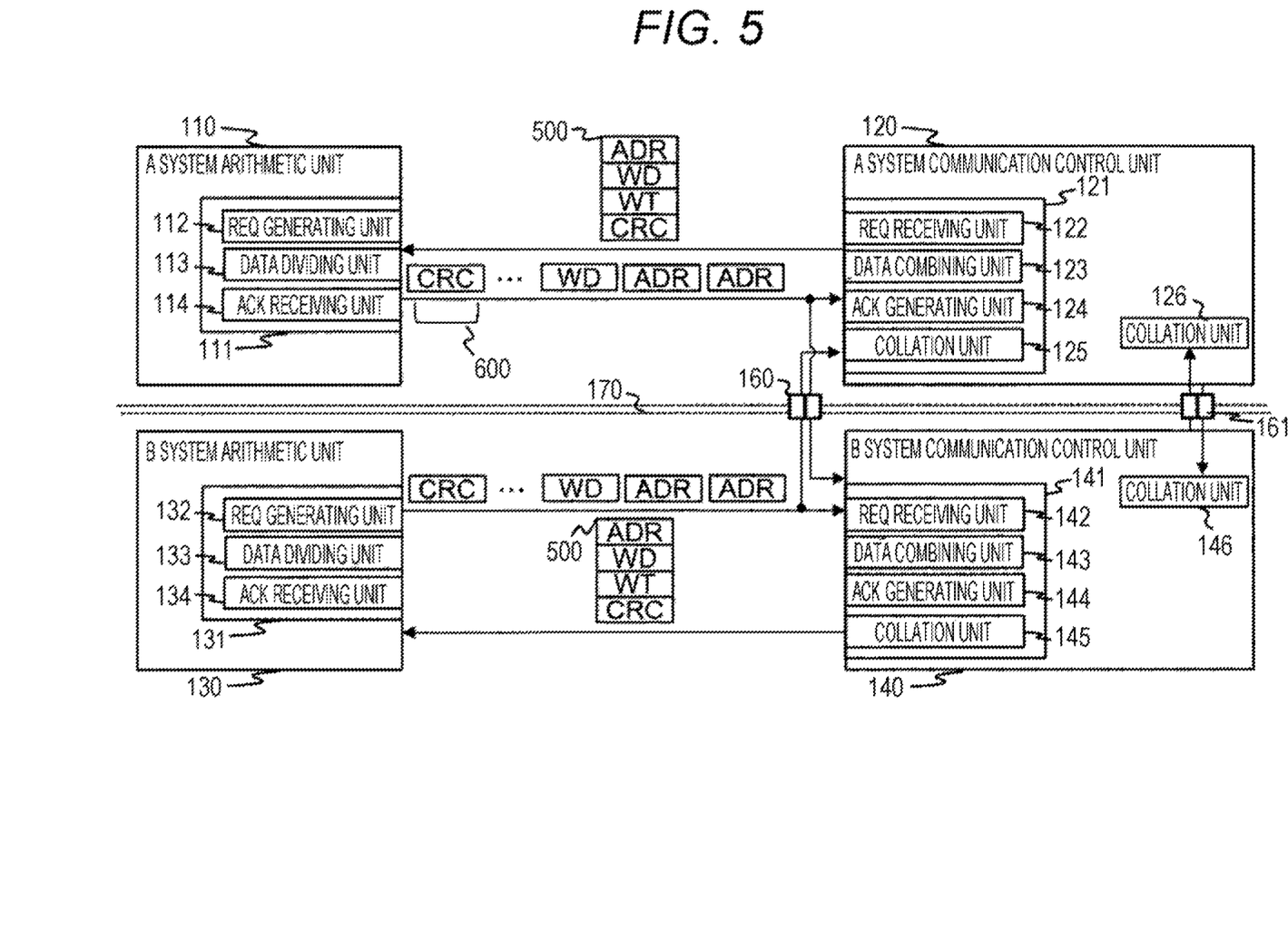
FIG. 5 is a diagram illustrating the collation of the divided frame which is output from the arithmetic unit.

A collation method of the divided frames is as illustrated in FIG. 5, the collation unit 125 in the A system communication control unit 120 and the collation unit 145 in the B system communication control unit 140 perform the collation for each of the divided frames, in which the frame 500 is divided according to the data width 600, and perform the collation for the number of times which is obtained by dividing the frame 500 by the data width 600, and thus, guarantee the collation as the frame 500. On the other hand, the frame which is transmitted to the A system arithmetic unit 110 from the A system communication control unit 120 and the frame which is transmitted to the B system arithmetic unit 130 from the B system communication control unit 140 are not collated, and the frame is collectively transmitted to the A system arithmetic unit 110 from the A system communication control unit 120 and to the B system arithmetic unit 130 from the B system communication control unit 140 without being divided. In consideration of the operation of the control system 1, this is because the collation is performed by the collation unit 125 in the A system communication control unit 120 and the collation unit 145 in the B system communication control unit 140, and thus, an abnormality can be prevented from being transmitted to the other devices.

Figure 6:
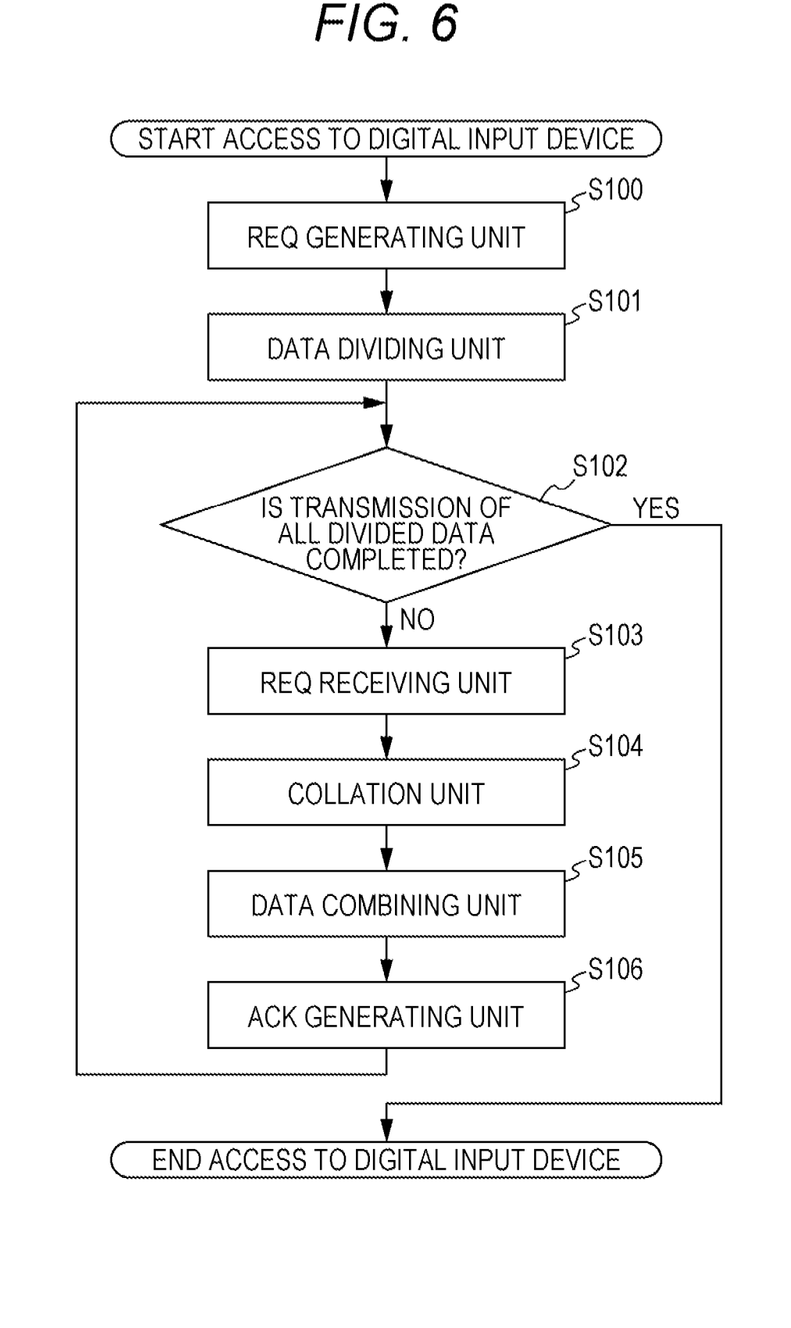
FIG. 6 is a diagram illustrating a frame transmission sequence of the arithmetic unit and a communication control unit.

The frame 500 illustrated in FIG. 2 is an example in which the frame 500 is configured of the ADR 501, the WD 502, the WT 503, the CRC 504 generated from the ADR 501, the WD 502, and the WT 503. In this case, communication sequences of the A system arithmetic unit 110 and the B system arithmetic unit 130, and the A system communication control unit 120 and the B system communication control unit 140 for accessing the digital input device 200 and the digital output device 300 are as illustrated in FIG. 6.

First, in S100, the REQ generating unit 112 in the A system arithmetic unit 110 fixes the values of the ADR 501, the WD 502, and the WT 503 configuring the frame 500, and the value of the CRC 504 generated from the ADR 501, the WD 502, and the WT 503, in order to import the digital signal from the digital input device. Next, in S101, as illustrated in FIG. 4, the data dividing unit 113 in the A system arithmetic unit 110 divides the frame 500 according to the data width 600, and selects the divided frame output from the data selector 601 provided in the data dividing unit 113. Next, in S102, in a case where all of the divided frames are transmitted in advance to the A system communication control unit 120 and the B system communication control unit 140, the access to the digital input device is ended, and in a case where the transmission is not completed, the divided frame, which is selected, is transmitted to the A system communication control unit 120 and the B system communication control unit 140. So far, a process has been described in which the A system arithmetic unit 110 transmits the divided frame to the A system communication control unit 120 and the B system communication control unit 140, and the same applies to the B system arithmetic unit 130, and thus, the divided frames output from the A system arithmetic unit 110 and the B system arithmetic unit 130 are respectively input into the A system communication control unit 120 and the B system communication control unit 140.

Next, in S103, the REQ receiving unit 122 in the A system communication control unit 120 performs receiving processing in consideration of a delay difference between the divided frame output from the A system arithmetic unit 110 and the divided frame output from the B system arithmetic unit 130, and in S104, the collation unit 125 in the A system communication control unit 120 performs the collation of the divided frames. Next, in S105, the data combining unit 123 in the A system communication control unit 120 reconstructs the divided frame to the frame 500. A reconstructing method is as illustrated in FIG. 4, and the data combining unit 123 in the A system communication control unit 120 performs the reconstruction by sequentially applying the divided frames into a format of the frame 500 by the data selector 602 provided inside. Next, in S106, the ACK generating unit 124 in the A system communication control unit 120 transmits the response signal to the A system arithmetic unit 110 in order to notify that the divided frame is received from the A system arithmetic unit 110 and the B system arithmetic unit 130. After that, the process returns to S102, the processing is continued until the A system arithmetic unit 110 transmits all of the divided frames to the A system communication control unit 120 and the B system communication control unit 140. So far, the processing of the A system communication control unit 120 has been described, and the same applies to the B system communication control unit 140, and the divided frames output from the A system arithmetic unit 110 and the B system arithmetic unit 130 are received, and the response signal is transmitted to the B system arithmetic unit 130 through the REQ receiving unit 142, the collation unit 145, the data combining unit 143, and the ACK generating unit 144.

Furthermore, in the example described above, CRC is used for confirming that the frame is transmitted without an error, and parity check which is an error detect section using a parity bit or a confirmation method using error check and correct (ECC) may be applied. In addition, examples of a confirmation method of the frame using the CRC include a method of performing the guarantee by confirming the CRC 504 generated from the ADR 501, the WD 502, and the WT 503 after the A system communication control unit 120 combines the divided data, and a method of confirming that there is no error in each divided data item by applying the CRC to each of the divided data items output from the A system arithmetic unit 110, but the present invention is not particularly limited to such confirmation methods, and any method can be applied to the present invention.

Figure 7:
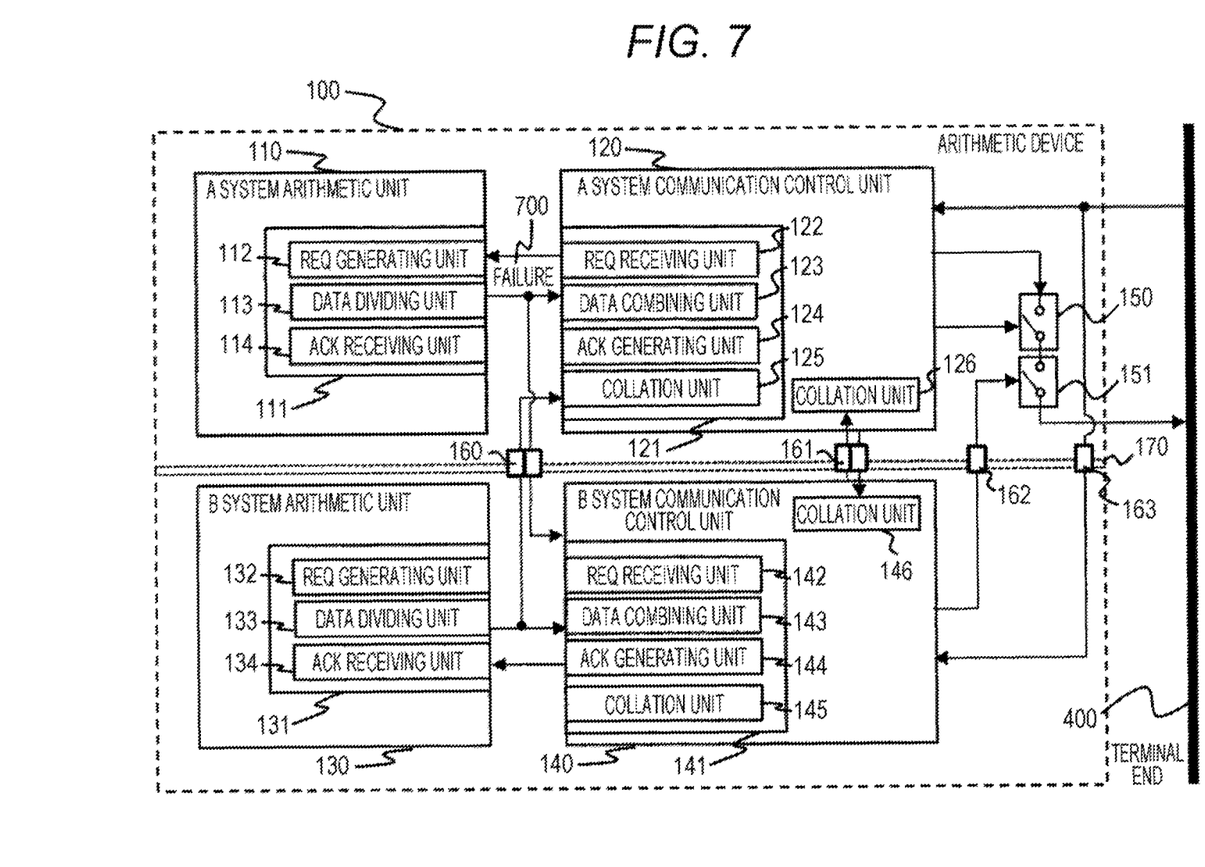
FIG. 7 is a diagram illustrating abnormality detection when an A system arithmetic unit is faulty.
Figure 8:
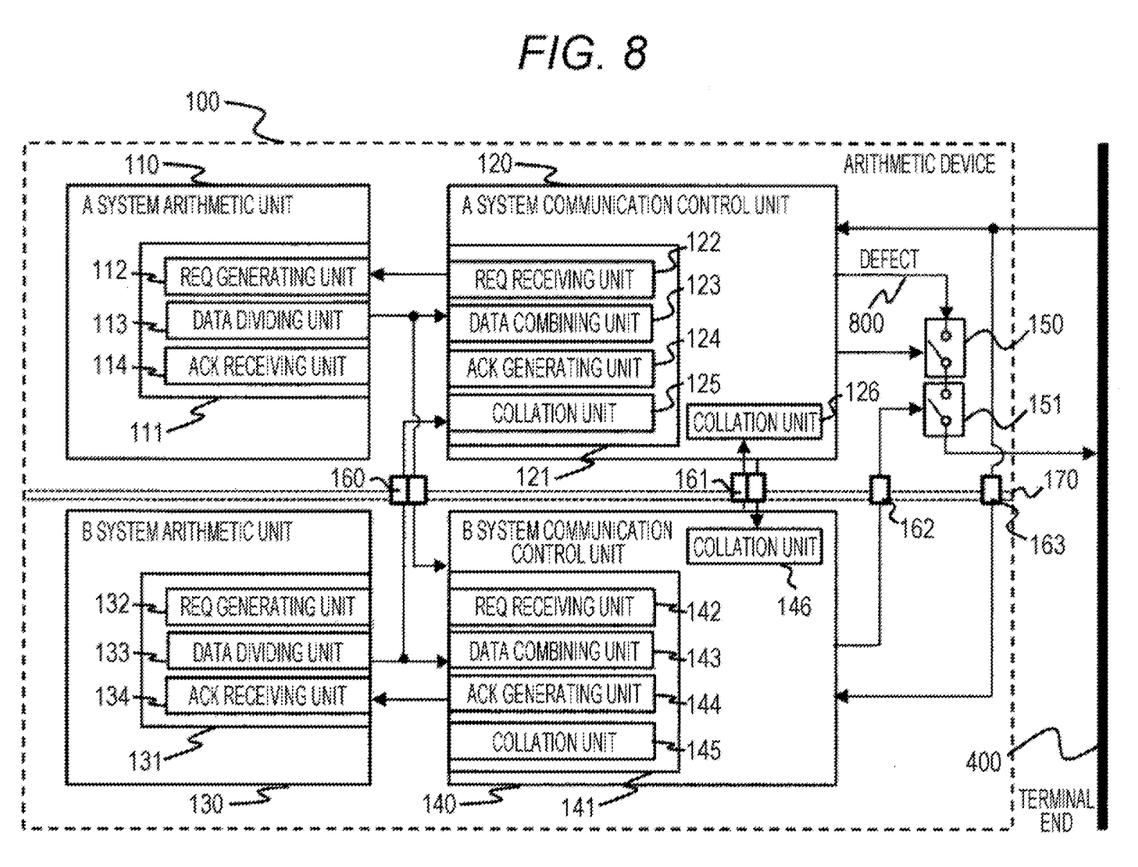
FIG. 8 is a diagram illustrating abnormality detection when an A system communication control unit is faulty.

So far, the communication sequence in the arithmetic device 100 has been described. Hereinafter, abnormality detection when a failure occurs in the arithmetic device 100 will be described. As illustrated in FIG. 7, in a case where a failure 700 occurs in the A system arithmetic unit 110, and an error is included in the frame output from the A system arithmetic unit 110, the collation results of the frames output from the A system arithmetic unit 110 and the B system arithmetic unit 130 are discordant, and thus, it is possible for the collation unit 125 in the A system communication control unit 120 to detect the occurrence of the failure 700. The same applies to the collation unit 145 in the B system communication control unit 140, and the collation results of the frames output from the A system arithmetic unit 110 and the B system arithmetic unit 130 are discordant, and thus, it is possible to detect the occurrence of the failure 700. In addition, as illustrated in FIG. 8, in a case where a failure 800 occurs in the A system communication control unit 120, and an error is included in the collation result output from the A system communication control unit 120, the blocking section 151 is suitably controlled by the B system communication control unit 140 even in a case where the frame transmission is not capable of being controlled by the blocking section 150, and thus, the frame is not transmitted to the communication line 400 at the time of an abnormality.

The digital signal, which is the response signal to the arithmetic device 100 from the digital input device 200, is transmitted through the communication line 400. The response signals to the arithmetic device 100 are input in parallel into the A system communication control unit 120 and the B system communication control unit 140 from the communication line 400. At this time, the collation of the frames is not performed between the communication line 400 and the A system communication control unit 120, between the communication line 400 and the B system communication control unit 140, between the A system communication control unit 120 and the A system arithmetic unit 110, and between the B system communication control unit 140 and the B system arithmetic unit 130. This is because, in consideration of the operation of the control system 1 configured of the arithmetic device 100, the digital input device 200, and the digital output device 300, the response signal input into the arithmetic device 100 from the digital input device 200 is used for the control arithmetic in the arithmetic device 100, and the control arithmetic result is transmitted to the digital output device 300 according to a transmission mode of dividing the frames, and thus, even in a case where the collation of the frames is not performed between the communication line 400 and the A system communication control unit 120, between the communication line 400 and the B system communication control unit 140, between the A system communication control unit 120 and the A system arithmetic unit 110, and between the B system communication control unit 140 and the B system arithmetic unit 130, it is possible to detect an abnormality by any one of the collation unit 125 in the A system communication control unit 120 and the collation unit 145 in the B system communication control unit 140 when a failure occurs.

Figure 9:
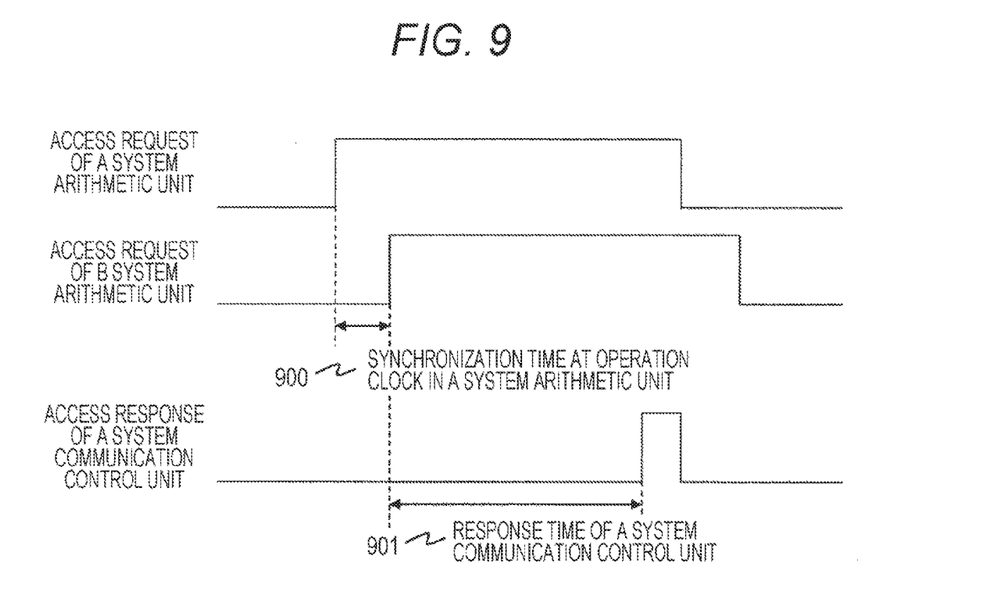
FIG. 9 is a diagram illustrating an access response of the A system communication control unit.

Returning to FIG. 1, non-synchronous transmission in a case of performing the signal transmission between different systems will be described. The signal transmission to the A system communication control unit 120 from the A system arithmetic unit 110 and the signal transmission to the B system communication control unit 140 from the B system arithmetic unit 130 are respectively synchronous transmission since operation clocks are the same, the signal transmission to the B system communication control unit 140 from the A system arithmetic unit 110 across the gap 170 and the signal transmission to the A system communication control unit 120 from the B system arithmetic unit 130 across the gap 170 are respectively non-synchronous transmission since operation clocks are different from each other. The A system communication control unit 120 receives the access request from the A system arithmetic unit 110 and the B system arithmetic unit 130 in order to import the digital signal from the digital input device, and in the A system communication control unit 120, the access request from the B system arithmetic unit 130 is the non-synchronous transmission across the gap 170, and thus, as illustrated in FIG. 9, synchronization time 900 is required at the operation clock in the A system arithmetic unit. In a case where of the access request of the A system arithmetic unit 110 and the access request of the B system arithmetic unit 130 are effective after the synchronization time 900 elapses, the access response of the A system communication control unit 120 is effective after response time 901 of the A system communication control unit 120 elapses, and the access request of the A system arithmetic unit 110 is cancelled.

Figure 10:
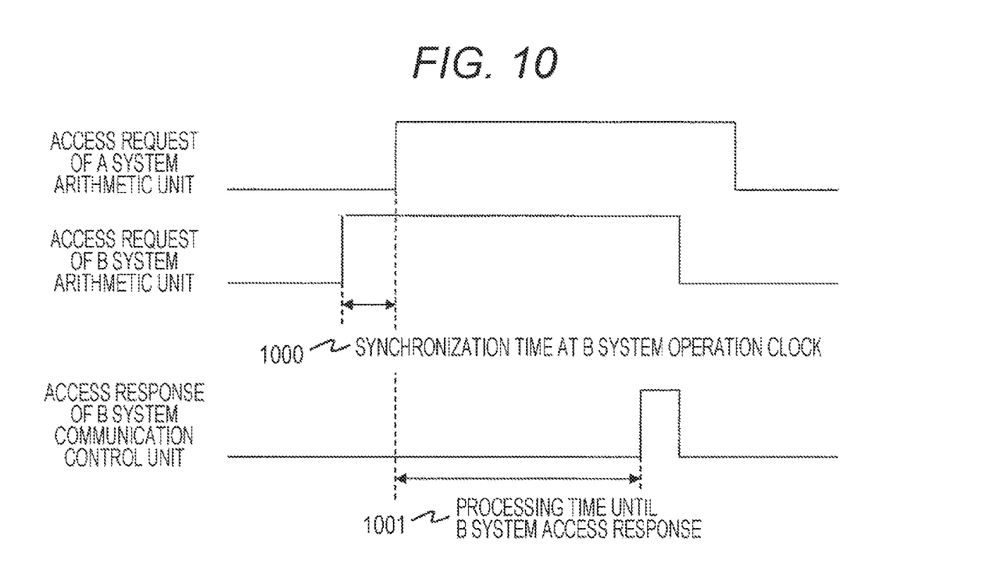
FIG. 10 is a diagram illustrating an access response of a B system communication control unit.

The same applies to the access response of the B system communication control unit 140, and as illustrated in FIG. 10, in the B system communication control unit 140, the access request from the A system arithmetic unit 110 is the non-synchronous transmission across the gap 170, and thus, synchronization time 1000 is required at the operation clock in the B system arithmetic unit 130. In a case where the access request of the A system arithmetic unit 110 and the access request of the B system arithmetic unit 130 are effective after the synchronization time 1000 elapses, the access response of the B system communication control unit 140 is effective after response time 1001 of the B system communication control unit 140 elapses, and the access request of the B system arithmetic unit 130 is cancelled.

Next, the operation of the digital input device 200 of the control system 1 will be described. As illustrated in FIG. 1, in a case where a frame representing a digital signal import request of the own device is received from the arithmetic device 100 through the communication line 400, the A system communication control unit 210 and the B system communication control unit 230 of the digital input device 200 instruct the A system input control unit 220 and the B system input control unit 240 to import the digital signal. The A system input control unit 220 and the B system input control unit 240 which receive the import instruction of the digital signal import the digital signal with respect to the signal source 410. When the import is completed, the A system communication control unit 210 and the B system communication control unit 230 transmit the digital signal to the arithmetic device 100.

The signals output from the A system input control unit 220 and the B system input control unit 240 are collated by the collation unit 211 in the A system communication control unit 210 and the collation unit 231 in the B system communication control unit 230. In a case where the collation result of the collation unit 211 is discordant, the signal transmission is blocked by the blocking section 251, and in a case where the collation result of the collation unit 231 is discordant, the signal transmission is blocked by the blocking section 250, and thus, the signal is prevented from being transmitted to the communication line 400.

Next, the operation of the digital output device 300 of the control system 1 will be described. As illustrated in FIG. 1, in a case where a frame representing a digital signal output request of the own device is received from the arithmetic device 100 through the communication line 400, the A system communication control unit 310 and the B system communication control unit 330 of the of the digital output device 300 instruct the A system output control unit 320 and the B system output control unit 340 to output the digital signal. The A system output control unit 320 and the B system output control unit 340 which receive the digital signal output instruction output the digital signal with respect to the control target 420. In a case where the output is completed, the A system communication control unit 310 and the B system communication control unit 330 transmit the response signal of notifying the arithmetic device 100 of the completion of the output.

The response signals output from the A system output control unit 320 and the B system output control unit 340 are collated by the collation unit 311 in the A system communication control unit 310 and the collation unit 331 in the B system communication control unit 330. In a case where the collation result of the collation unit 311 is discordant, the signal transmission is blocked by the blocking section 351, and in a case where the collation result of the collation unit 331 is discordant, the signal transmission is blocked by the blocking section 350, and thus, the signal is prevented from being transmitted to the communication line 400.

As described above, the control system 1 according to this embodiment includes the arithmetic device 100, the digital input device 200, and the digital output device 300, and the arithmetic device 100 and the digital input device 200, and the arithmetic device 100 and the digital output device 300 are connected by the communication line 400. In addition, the arithmetic device 100 and the digital input device 200, and the arithmetic device 100 and the digital output device 300 are communicated by a frame. When the import request is performed in the digital input device 200 in order to import the digital signal and the access to the digital output device 300 is performed in order to control the control target 420 from the imported digital signal, the arithmetic device 100 transmits the frame by dividing the frame, and when the response signals from the digital input device 200 and the digital output device 300 are transmitted to the arithmetic device 100, the signals are collectively transmitted to the A system arithmetic unit 110 from the A system communication control unit 120 and to the B system arithmetic unit 130 from the B system communication control unit 140 without performing the collation of the frames, and thus, the number of interface elements required for the signal transmission across the gap 170 is reduced.

According to the present invention, the frame transmission of the A system and the B system is performed by dividing the frame, and the digital signal imported from the digital input device and the response signal from the digital output device are collectively transmitted in the same system and are not transmitted to another system, and thus, it is possible to reduce the interface element required for the signal transmission between different power supply systems compared to the related art, and to improve the mounting convergence of the device.

In addition, it is possible to increase the number of times of the collation between the systems, and thus, it is possible to more easily specify an abnormality portion compared to the related art, a wiring resource is decreased according to a decrease in the signal width to be transmitted by dividing the frame, and thus, it is possible to make a wiring operation of a print substrate easy, and a wiring length is easily arranged according to a decrease in the signal width to be transmitted by dividing the frame, and thus, it is possible to easily perform skew adjustment and to increase a clock rate.

The present invention is not limited to the embodiment described above, and includes other modification examples and application examples unless deviating from the gist of the present invention described in claims. In addition, the embodiment described above has been described in detail in order to describe the present invention to be easily understood, and it not limited to necessarily have the entire configuration described above. In addition, a part of the configuration of one embodiment can be substituted with the configuration of the other embodiment, and the configuration of the embodiment can be added to the configuration of one embodiment. In addition, other configurations can be added to, deleted from, or substituted with a part of the configuration of the embodiment.

What is claimed is:

1. A control system, comprising:
an arithmetic device configured of an A system arithmetic unit including a first data dividing unit, a B system arithmetic unit including a second data dividing unit, and an A system communication control unit including a data combining unit and a collation unit,
wherein the A system arithmetic unit and the B system arithmetic unit form a duplex system,
the A system arithmetic unit and the B system arithmetic unit are separated by a gap such that wirings between the A and B system arithmetic units do not cross,
a frame output from the A system arithmetic unit is transmitted to a B system communication control unit through the A system communication control unit and a first interface element, and a frame output from the B system arithmetic unit is transmitted to the A system communication control unit through the B system communication control unit and a second interface element, and wherein a signal which is transmitted to the A system communication control unit and the B system communication control unit from the A system arithmetic unit is transmitted by being divided, a signal which is transmitted to the A system communication control unit and the B system communication control unit from the B system arithmetic unit is transmitted by being divided, a response signal which is transmitted to the A system arithmetic unit from the A system communication control unit is collectively transmitted without being divided, a response signal which is transmitted to the B arithmetic unit from the B system communication control unit is collectively transmitted without being divided, and the response signals from the A system communication control unit and the B system communication control unit are not collated in the arithmetic device.

2. The control system according to claim 1, wherein the A system arithmetic unit and the B system arithmetic unit include an REQ generating unit and an ACK receiving unit, and the A system communication control unit and the B system communication control unit include an REQ receiving unit and an ACK generating unit.

3. The control system according to claim 1, wherein the arithmetic device includes a section of blocking the transmitted frame in a case in which a collation result of the A system communication control unit is discordant and a section of blocking the transmitted frame in a case in which a collation result of the B system communication control unit is discordant.

4. The control system according to claim 1, wherein the control system has a CRC or parity check, or an error detecting function of the transmitted frame of using ECC in order to detect an error of the transmitted frame between the arithmetic device and a digital input device, and between the arithmetic device and a digital output device.

5. The control system according to claim 1, wherein communication between the arithmetic device and a digital input device, and between the arithmetic device and a digital output device is performed by a frame, and a dividing width of the frame is capable of being changed.

* * * * *